United States Patent [19]

Kohnert et al.

[11] Patent Number: 4,775,981
[45] Date of Patent: Oct. 4, 1988

[54] MELTING FURNACE WITH WEIGHT-RELATED CONTROL OF THE CONSUMABLE ELECTRODE

[75] Inventors: Heinz Kohnert, Rodenbach; Rudolf Randa, Hanau; Otto W. Stenzel, Gruendau, all of Fed. Rep. of Germany

[73] Assignee: Leybold-Heraeus GmbH, Cologne, Fed. Rep. of Germany

[21] Appl. No.: 116,000

[22] Filed: Nov. 2, 1987

[30] Foreign Application Priority Data

Jul. 9, 1987 [DE] Fed. Rep. of Germany ....... 3722680

[51] Int. Cl.$^4$ ............................................ H05B 7/148
[52] U.S. Cl. ........................................................ 373/70
[58] Field of Search ................... 373/70, 67, 102, 104, 373/105, 108, 69

[56] References Cited

U.S. PATENT DOCUMENTS

| 3,614,284 | 10/1971 | Rossdorf et al. | 373/70 |
| 4,002,816 | 1/1977 | Zhupakhin et al. | 373/70 |
| 4,569,056 | 2/1986 | Veil, Jr. | 373/70 |

Primary Examiner—Roy N. Envall, Jr.
Attorney, Agent, or Firm—Felfe & Lynch

[57] ABSTRACT

In a melting furnace with weight-related control of the consumable electrode, the electrode mounting is disposed in a separate pressure chamber which has an inverted bottle-shaped configuration. The downwardly extending neck-like portion is passed sealingly through an opening in the cover plate of the melting chamber. The pressure chamber is suspended from a crossbeam which can be driven vertically by means of spindles. On the upper end of the pressure chamber there is provided a bellows whose upper edge is joined to the upper, tubular portion of the electrode holding rod, while a solid rod holding a current-carrying tube extends coaxially through the tubular portion and is hung from a frame which suspends the electrode holding rod and which is supported on the crossbeam by a sensor. Between the crossbeam and the hanger frame there is provided an auxiliary cylinder which is joined by a pressure hose 33 to the pressure cylinder, by which the pressure forces acting on the tubular portion and the electrode holding rod are compensated.

11 Claims, 1 Drawing Sheet

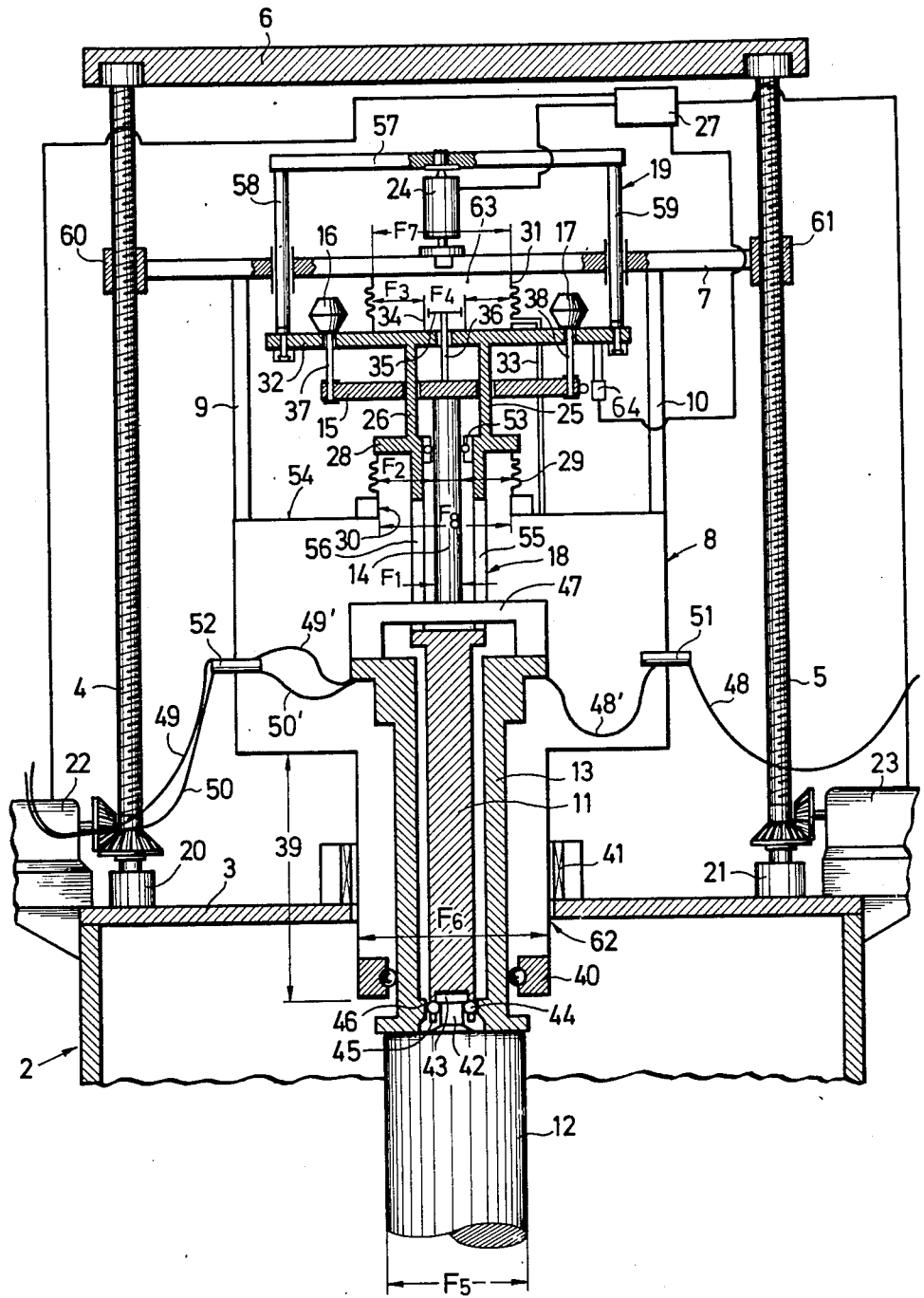

MELTING FURNACE WITH WEIGHT-RELATED CONTROL OF THE CONSUMABLE ELECTRODE

BACKGROUND OF THE INVENTION

The invention relates to a melting furnace wherein the movement of the consumable electrode is controlled according to the weight of the electrode, the electrode mounting passes through the furnace wall and is disposed for longitudinal movement, the furnace has a crossbeam that can be moved in the direction of feed and holds the electrode mounting, and the furnace has an auxiliary cylinder acting on the mounting and actuated by the pressure in the melting chamber, plus a sensor for measuring the weight of the consumable electrode.

The weight data can be used for current or power programming, for pressure programming, and the like. Controlling the melting rate via the continuous measurement of the weight of charges is often preferred because the other data usable for control, such as the electrode travel, are unreliable with respect to the melting rate, which is what must be controlled. Experience shows that determining the reduction of the weight of the charge per unit time, i.e., computing the quotients of the differences for regulating and control purposes, leads to a great uniformity of the melting process. German Patent 1758971 discloses the association of a force-dependent resistance with a point on the melting system which is under the influence of the consumable electrode weight, and the feeding of the electrical data thus obtained through an amplifier and a difference detector to an apparatus for controlling the melting rate. Since the unsteady friction forces falsely reflect an irregular melting rate and produce regulating actions which can overdo the process, compensating means are already provided in the known apparatus. Furthermore, in U.S. Pat. No. 3,272,905 it is proposed to apply the feed rate detectors to the points of transition between the feed system and the electrode holder. In this manner the friction forces at a gasket that may be present are indeed not measured by the weight detector, but the detector is in the interior of the furnace where it is exposed to the effect of heat, and the current, which can amount to thousands of amperes, flows through it. Moreover, in the case of great electrode weights, and the leverage which the electrode has, such a detector is hardly able to withstand such severe operating conditions, and this again leads to a considerable loss of accuracy of measurement. Also, an intensive water cooling of the detector is essential.

Now, it is the aim of the present invention to create a weight-related control apparatus for a melting furnace, which will be capable of lowering an electrode or consumable electrode of especially great weight and large diameter with great sensitivity into the melting chamber, which is under high pressure. In particular, the weight of the electrode, which varies during the melting process, is to be registrable within very narrow limits, so that the melting process will remain precisely controllable in all phases.

SUMMARY OF THE INVENTION

This is achieved according to the invention by a pressure chamber which is fixedly joined to the crossbeam and opens into the melting chamber, and is brought into the latter in a pressure-tight manner through the cover plate of the melting chamber, while the electrode mounting is brought in a pressure-tight manner through its upper end, and rests upon the sensor which in turn rests on the crossbeam.

To enable the conductors carrying the current to the electrode and mounting to be of a very generous size, the pressure chamber can be provided with a somewhat bottle-shaped configuration in which the cylindrical neck of smaller diameter is brought sealingly through an annular sliding gasket through an opening in the cover plate.

Advantageously, the electrode mounting consists of an electrode holding rod having a tubular, partially slotted upper end portion with a collar or flange, and it has a current-carrying tube surrounding the holding rod; a bail provided on the current-carrying tube passes through the slot and a shank is affixed to this bail. The flange on the upper end of the electrode holding rod is sealed against the face of the pressure chamber by a bellows, and the shank of the bail is brought through the central opening in the flange. The flange is fixedly joined by tension rods to the bottom member of a hanger frame which rests on a sensor supported on the crossbeam, and the shank of the bail has a crossbar which is linked by lift jacks to the bottom member of the hanger frame.

In a preferred embodiment of the invention, the pressure chamber has electric power feed-throughs through which the electrical current is conducted from a power source through the wall of the pressure chamber to the current-carrying tube, the conducting cables being arranged in festoons so that both the current-carrying tube and the pressure chamber can be raised and lowered without interference.

According to the further invention, the frame which suspends the electrode mounting on a sensor on the crossbeam is formed of a lower and an upper horizontal frame member with two vertically disposed rods joining these two frame members together, while an auxiliary cylinder constituted by a bellows is gripped between the bottom frame member and the crossbeam which joins together the two nuts on the spindles, the sensor being held between the crossbeam and the upper frame member.

Advantageously, a perpendicularly disposed equalizing cylinder is fixedly disposed on the bottom frame member forming the bottom of the auxiliary cylinder, and its open upper end communicates with the auxiliary cylinder, while a piston is sealingly carried in the equalizing cylinder for longitudinal displacement and is coupled by a perpendicular piston rod to the shank of the bail.

To enable the electrode to be released from its mounting, one or more lift jacks are supported on the bottom member of the hanger frame. Their pistons are coupled by rods to the crossbar which in turn is fixedly joined to the shank of the bail such that, when the jacks are operated, the rod holding the electrode is raised vertically upward.

So that the bellows can be made as small as possible, the effective surface area of the tubular part of the electrode holder, on which the pressure in the pressure chamber acts is equal to the cross-sectional area of the auxiliary cylinder formed by the bellows, the bottom frame member and the crossbeam. It is advisable to make the inside diameter of the neck portion of the pressure chamber greater than the effective cross section of the auxiliary cylinder, which is equal to the cross-sectional area of the bellows, on which the pressure in the melting chamber acts.

Advantageously, the sensor is disposed outside of the pressure chamber so that pressure variations in the melting chamber will have no effect on the weight measurement. If the electrode should collide with the crucible disposed below it, the weight will be taken off the sensor, in which case a limit switch will give a signal to the electronic control system and provide for the shut-off of the apparatus.

BRIEF DESCRIPTION OF THE DRAWING

The invention permits of a great variety of embodiments; one of them is represented diagrammatically in the appended drawing.

DETAILED DESCRIPTION OF PREFERRED EMBODIMENT

The apparatus consists substantially of the following: the two spindles 4 an 5 rotatably mounted in thrust bearings 20 and 21 in the cover plate 3 closing the top of the melting chamber 2, with the yoke 6 joining them together, a crossbeam 7 carried in nuts 60 and 61 on the two spindles 4 and 5, the pressure chamber 8 suspended from the crossbeam 7 on rods 9 and 10, the electrode holding rod 11 which is displaceable in the pressure chamber together with the consumable electrode 12 suspended therefrom, a current carrying tube 13 disposed coaxially with the electrode holding rod 11, the shank 14 with crossbar 15 prolonging the current-carrying tube 13 upwardly, and the lift jacks 16 and 17 fastened to the two free ends of the crossbar 15, and the tubular end 18 with hanger frame 19 prolonging the holding rod 11 and provided with openings or slots 55 and 56.

The two spindles 4 and 5 journaled in thrust bearings 20 and 21 on the cover plate 3 are set in rotation by the motors 22 and 23 to raise or lower the consumable electrode 12, the crossbeam 7 moving up or down according to the direction of rotation. Since the pressure chamber 8 is also fastened to the crossbeam 7 via the rods 9 and 10, it too follows the vertical movements of the crossbeam, as does also the hanger frame 19 which is supported by the dynamometer bearing or sensor 24 on the crossbeam 7 and is suspended on the two rods 25 and 26 from the holding tube 18 and the electrode holding rod 11. The dynamometer bearing 24 is connected to an electronic control system 27 represented diagrammatically in the drawing, and is capable of producing a signal that is always proportional to the precise weight of the consumable electrode 12.

Since a considerable pressure, of for example 40 bar, prevails in the melting chamber during the melting process, this pressure acts also on the cross-sectional areas F1 of the shank 14 and the annular surface F2 of the flange 28 of the holding tube 18. Now, in order to compensate the force $P \times F2$ which controls the signal of the dynamometer bearing 24, on the one hand the flange 28 of the tubular end 18 is connected via a first bellows 29 to the passage 30 and, on the other hand, a second bellows 31 is provided as an auxiliary cylinder 63 between the crossbeam 7 and the lower frame member 32 of the hanger frame 19, the interior of this auxiliary cylinder 63 formed by the second bellows 31 being connected by a pressure hose 33 to the pressure chamber. On the frame member 32 there is also fastened an equalizing cylinder 34 in which a piston 35 is carried which is coupled through a piston rod 36 to the crossbar 15 and follows the movements of the shank 14 and of the current carrying tube 13. The two lift jacks 16 and 17 whose membranes or pistons are connected by the rods 37 and 38 to the crossbar 15 are borne on the frame member 32 of the hanger frame 19.

Between the neck portion 39 of the pressure chamber 8 and the current carrying tube 13 there is provided a rolling-contact bearing 40 assuring that a relative movement between the current carrying tube 13 with shank 14 and crossbar 15 on the one hand, and the electrode holding rod 11 with the tubular upper end 18 on the other, will remain unaffected by any appreciable friction. The outer wall of the neck part 39 of the bottle-shaped pressure chamber 8 is hermetically sealed by a sliding seal 41 against the cover plate 3 of the melting chamber, so that the pressure prevailing in the melting chamber will be equal to the pressure in the coating chamber.

The consumable electrode 12 is provided with a stem 42 whose wider head 43 is held on the electrode holding rod 11 by locking means 44, the locking means 44 being engaged on the one hand in corresponding recesses in the tubular bottom end 45 of the electrode holding rod and on the other hand in the bottom head portion; it is prevented from shifting laterally by the collar 46. If the crossbar 15 with the shank 14, along with the bail 47 and the current carrying tube, are displaced with respect to the frame member 32 by the lift jacks 16 and 17, the locking means 44 can shift radially outwardly enough to separate from the head 43 so that the stem 42 with the consumable electrode 12 can be removed downwardly.

Power is fed to the consumable electrode 12 through cables 48, 49, and 50 on the one side, and 48', 49' and 50' on the other, these cables being connected through lead-throughs 51 and 52 to the current carrying tube 13. It is clear that the rolling contact bearings 40 must be made as electrical insulators, because otherwise the pressure chamber 8, and with it all the rest of the parts of the apparatus would be at the same electrical potential.

Since the shank 14 is sealed against the tubular end 18 by a sliding seal 53, the pressure prevailing in the pressure chamber 8 also acts on the cross-sectional area F1 of the shank 14 and on the annular area F2 of the flange 28 of the holding tube 18. These upwardly directed forces are compensated through the auxiliary cylinder formed by the bellows 31 in which the same pressure prevails as in the pressure chamber 8, the annular area F3 being equal to the annular area F2, and the cross-sectional area F4 of the piston 35 being equal to the cross-sectional area F1 of the shank 14. It is thus always possible to determine the weight of the consumable electrode 12 by means of the dynamometer bearing 24, since the pressures in the melting chamber 2, which influence a measurement, are compensated by the auxiliary cylinder.

An important advantage of the apparatus described is that even electrodes 12 of especially great weight and extremely large cross section F5 can be handled sensitively by the apparatus, since on the one hand the inside diameter F6 of the neck 39 of the pressure chamber can be made virtually as large as desired, and on the other hand the diameter F7 and F8 of the two bellows 29 and 31 can remain comparatively small. For a sensitive handling and control of the consumable electrode feed, however, it is especially important to make the bellows 29 and 31 as small as possible, since on the one hand large bellows require high deformation forces and on the other hand high pressure in bellows of large diameter are hard to handle.

Lastly, attention is called to the electrical switch 64 which senses the relative movement between the hanger frame 19 and the crossbar 15, and which is inserted in the circuit of the electronic control system 27 such as to assure, among other things, that the passage of current from the current carrying tube 13 to the consumable electrode 12 at the surface of contact between the upper end face of the consumable electrode 12 and the bottom end face of the current carrying tube 13 will not be unintentionally interrupted.

The hanger frame 19, the tubular end 18, the electrode holding rod 11 and the current carrying tube 13 with the shank 14, the crossbar 15, the two rods 37 and 38, and the two lift jacks 16 and 17 form a self-contained power system with regard to friction. The externally acting weights of the mounting 11, 13, 14, 18 plus any additional lift-guiding and linkage elements are perpendicularly borne by the sensor 24. That is to say, all parts whose weight is known and thus can be compensated electrically by potentiometer compensation or mechanically, e.g., by counterweights. The equal-sized bellows 29 and 31 are both held opposite one another on a stiff frame formed by the crossbeam 7, the rods 9 and 10 and the annular upper cover of the pressure chamber 8, so that their weights as well as the forces due to their stiffness are compensated.

We claim:

1. Melting furnace with weight-related control of the consumable electrode, comprising: a melting chamber having a cover plate: a mounting for a consumable electrode; a crossbeam movable in a feed direction; at least one threaded spindle for moving the crossbeam in the feed direction; the crossbeam bearing the mounting; and an auxiliary cylinder acting on the mounting; said crossbeam also being movable in the feed direction by the pressure in the melting chamber; a sensor for measuring the weight of the consumable electrode; and a pressure chamber affixed to the crossbeam, open toward the melting chamber, plunging into the latter and brought in a pressure-tight manner through the cover plate of the melting chamber, through an upper end surface of the pressure chamber the mounting for the consumable electrode being brought in a pressure-tight manner, the mounting being supported by the sensor on the crossbeam.

2. Melting furnace according to claim 1, wherein the cover plate has a sliding ring seal in an opening thereof, wherein the pressure chamber has an approximately bottle-shaped configuration having a cylindrical neck which is brought sealingly through the sliding ring seal in the opening of the cover plate and which neck has a bottom, open end having a rolling contact bearing and wherein the mounting is held and guided by the rolling-contact bearing at the bottom, open end of the neck.

3. Melting furnace according to claim 2, wherein the pressure chamber has an end face and which includes a bellows and wherein the mounting of the consumable electrode is formed of an electrode holding rod with a tubular, partially slotted end part with a collar or flange having a central opening and a current carrying tube which is drawn over the electrode holding rod and has a bail which reaches through the slot and has a second electrode holding rod fixedly disposed on the bail, the flange of the end part being sealed off from the end face of the pressure chamber by the bellows, and the second electrode holding rod being brough through the central opening in the flange, and a sensor on the crossbeam for supporting a hanger frame having a bottom frame member, the flange being fixedly joined to the bottom frame member of the hanger frame which is supported by the sensor on the crossbeam, and a crossbar and lift jacks for movably linking the second electrode holding rod being movably linked through a crossbar by lift jacks to the bottom frame member.

4. Melting furnace according to claim 3, wherein the pressure chamber has electric current lead-throughs through which electric current is conducted from a current source through a wall of the pressure chamber to the current carrying tube, and in which current-carrying cables are festooned such that both the current carrying tube and the pressure chamber can move up and down unhampered.

5. Melting furnace according to claim 3, in which the hanger frame supports the mounting on the sensor on the crossbeam and is formed of the bottom frame member and an upper horizontal frame member and two vertically disposed rods joining these frame members together, and which include two spindles having two nuts, and in which between the bottom frame member an the crossbeam joining together the two nuts of the spindles an auxiliary cylinder formed by a bellows is gripped, and in which the sensor is gripped between the crossbeam and the upper frame member.

6. Melting furnace according to claim 5, in which the bottom frame member forms the bottom of the auxiliary cylinder and on the bottom frame member a perpendicularly extending equalizing cylinder is fixedly disposed, having an upper, open end which opens into the auxiliary cylinder, the melting furnace including an equalizing chamber in which a piston is sealingly guided for longitudinal displacement and the furnace including a perpendicular piston rod coupling the piston to the electrode holding rod of the current carrying tube.

7. Melting furnace according to claim 5, which includes one or more lift jacks supported on the bottom frame member of the hanger frame, having pistons coupled to the crossbar which in turn is fixedly joined to the electrode holding rod such that, when the lift jacks are actuated, the electrode holding rod for the current carrying tube moves vertically upward with respect to the electrode holding rod holding the consumable electrode.

8. Melting furnace according to claim 6, which includes a holding tube having an effective annular surface area affected by the pressure in the pressure chamber is equal to the cross-sectional area of the auxiliary cylinder formed by the bellows, the bottom frame member and the crossbeam minus the cross-sectional area of the piston of the cylinder in the equalizing chamber.

9. Melting furnace according to claim 5, in which the inside diameter of the neck of the pressure chamber is made larger than the effective cross section of the auxiliary cylinder, which is equal to the cross-sectional area of the bellows that is acted by the pressure in the melting chamber.

10. Melting furnace according to claim 5, in which the sensor is disposed in the free atmosphere outside of the pressure chamber and is pressure-compensated through the auxiliary cylinder which is inserted into a linkage.

11. Melting furnace according to claim 1, which includes a switch disposed on the sensor and in the event of a collision of the consumable electrode, the sensor senses a relief of load, whereupon the switch disposed on the sensor and operating in relation to length of travel produces an electrical signal for the control of the feed.

* * * * *